United States Patent [19]

Ludwig

[11] 4,204,561

[45] May 27, 1980

[54] FUEL PRESSURE REGULATOR ASSEMBLY

[75] Inventor: George C. Ludwig, Owosso, Mich.

[73] Assignee: Tom McGuane Industries, Inc., Madison Heights, Mich.

[21] Appl. No.: 880,782

[22] Filed: Feb. 24, 1978

Related U.S. Application Data

[63] Continuation-in-part of Ser. No. 831,591, Sep. 8, 1977, abandoned.

[51] Int. Cl.$^2$ .............................................. F16K 31/12
[52] U.S. Cl. .................................... 137/510; 251/332; 251/357
[58] Field of Search ................. 251/332, DIG. 1, 357; 137/510

[56] References Cited

U.S. PATENT DOCUMENTS

| | | | |
|---|---|---|---|
| 2,678,187 | 5/1954 | Peters | 137/510 UX |
| 2,874,718 | 2/1959 | Kelly | 251/332 X |
| 2,959,392 | 11/1960 | Von Platen | 251/332 |
| 3,184,247 | 5/1965 | Leutwyler | 251/332 X |
| 3,405,730 | 10/1968 | Baumann | 137/510 |
| 3,511,270 | 5/1970 | Fehrenbach | 137/510 |

Primary Examiner—Harold W. Weakley
Attorney, Agent, or Firm—Barnes, Kisselle, Raisch & Choate

[57] ABSTRACT

A fuel pressure regulator assembly comprising, a housing, a diaphragm separating the housing into a first and second chamber, the housing has a radial inlet extending to the first chamber and a connector having an axial outlet is mounted in the housing and extends axially into the first chamber. The connector supports a sealing ring in a groove. The diaphragm supports a valve member that is adapted to engage the sealing ring, and a spring in the second chamber urges said valve member against the sealing ring.

12 Claims, 15 Drawing Figures

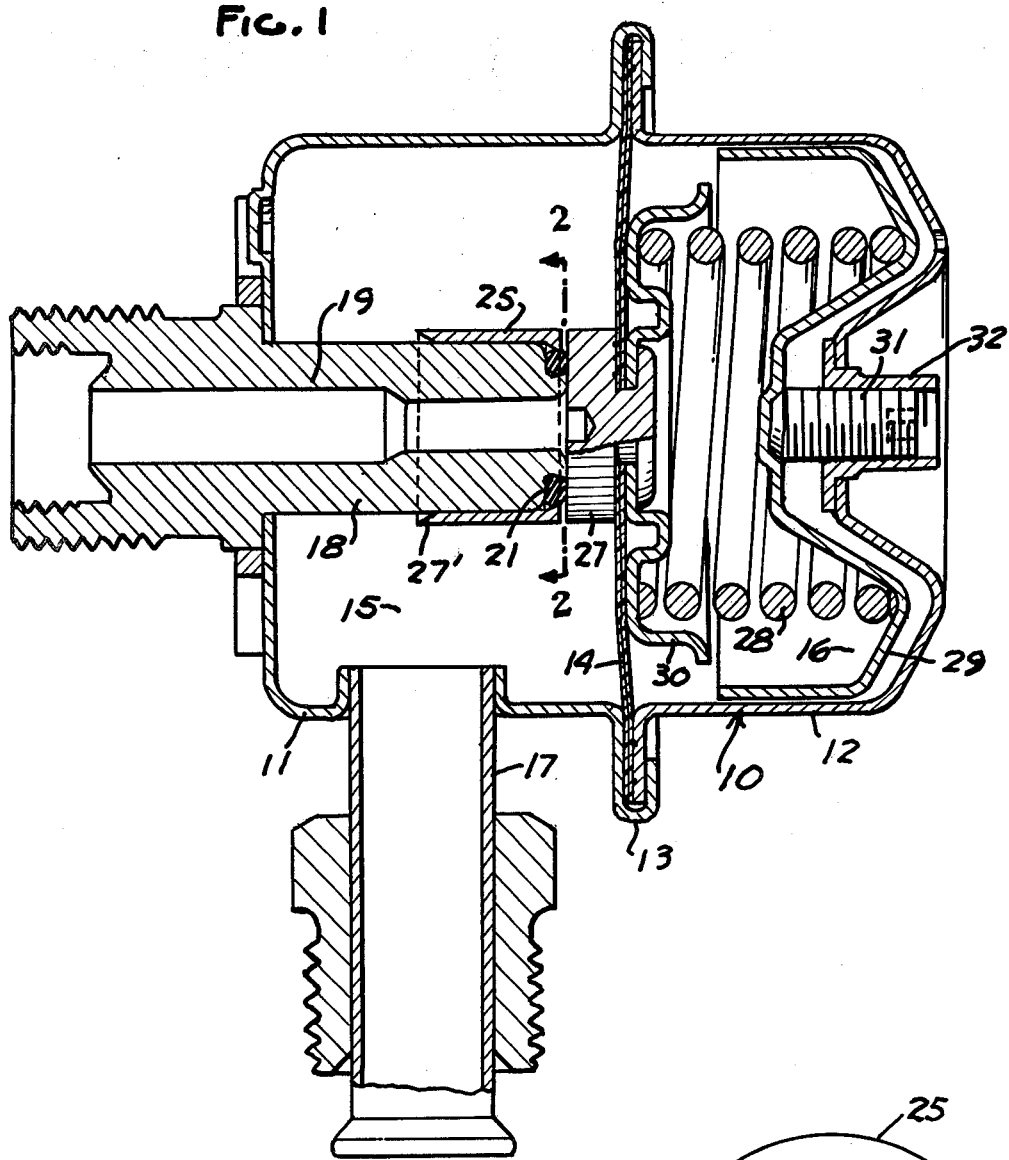
Fig. 1
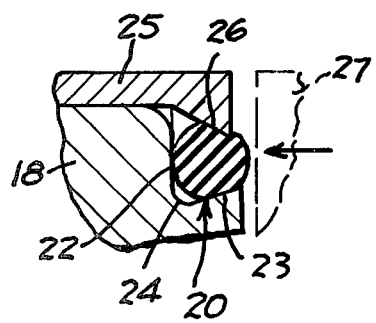
Fig. 3
Fig. 2

FUEL PRESSURE REGULATOR ASSEMBLY

This is a continuation-in-part application of application Ser. No. 831,591 filed Sept. 8, 1977, now abandoned.

This invention relates to fuel pressure regulator assemblies.

BACKGROUND AND SUMMARY OF THE INVENTION

In connection with the accurate control of fuels for internal combustion engine utilized in automobiles, it has become a common practice to utilize a fuel pressure regulator assembly. Such a device commonly includes a spring loaded diaphragm which function against a flat surface in a metal-to-metal contact to control the pressure of the fuel that is permitted to flow to the system.

In such a device, it is important to have an accurate control as well as a positive shut-off when the pressure is insufficient.

Accordingly, the present invention is directed to a fuel pressure regulator assembly incorporating improved construction for controlling and shutting off the flow of fuel.

In accordance with the invention the fuel pressure regulator assembly comprises a housing and a diaphragm separating said housing into a first and second chamber. The housing has a radial inlet extending to the first chamber and a connector having an axial outlet is mounted in the housing and extends axially into the first chamber. The connector supports a sealing ring in a groove. The diaphragm supports a valve member that is adapted to engage the sealing ring, and a spring in the second chamber urges the valve member against said sealing ring.

DESCRIPTION OF THE DRAWINGS

FIG. 1 is a part sectional view of a fuel pressure regulator assembly embodying the invention;

FIG. 2 is a view taken along the line 2—2 in FIG. 1;

FIG. 3 is a fragmentary sectional view on an enlarged scale of a portion of the fuel pressure regulator assembly shown in FIG. 1;

DESCRIPTION

Figure 4:
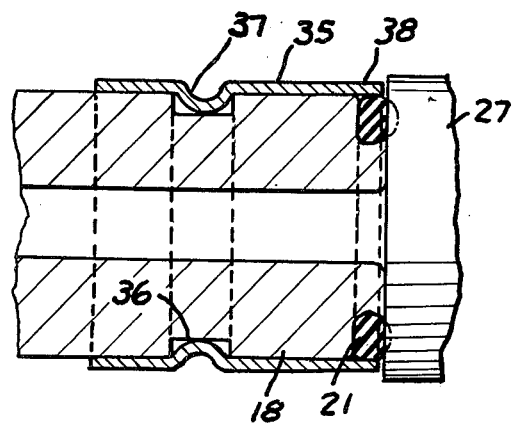
FIG. 4 is a fragmentary sectional view of a portion of a modified form of fuel pressure regulator assembly.

Referring to FIG. 1, the fuel pressure regulator assembly embodying the invention comprises a housing 10 including two housing parts 11,12 joined together by a crimping cover 11 over cover 12 which also crimps and holds diaphragms 14 dividing the housing into a first chamber 15 and a second chamber 16. An inlet 17, in the form of a pipe, extends to the first chamber 15 for providing fuel to the chamber 15. A connector 18 is provided in the housing part 11 and extends axially and includes an axial opening 19 defining an outlet.

Referring to FIG. 3, the end of the connector 18 is formed with an annular groove 20 that has a sealing ring in the form of an O-ring 21 therein. The groove 20 opens radially outwardly and is formed by a shoulder that includes a first flat annular radial surface 22, a second annular surface 23 forming an acute angle with the surface 22 and extending radially and axially outwardly toward the free end of the connector 18 and a curved connecting portion 24 between surfaces 22,23 having a lesser radius than the O-ring 21. The dimensions are such that when the O-ring 21 is in position, a portion of the O-ring extends axially beyond the end of the connector 18.

A generally cylindrical retainer 25 has a friction or interference fit with the periphery of the cylindrical exterior of the connector 18 and includes an annular rim at the outer end having a radially and axially inwardly directed inner surface 26 that facilitates retention of the O-ring on the end of the connector 18. In order to facilitate insertion of the retainer 25 on the connector 18, an inclined surface 27' is provided on the inner end of the retainer 25 (FIG. 1).

The diaphragms 14 support a valve 27 which has a flat radial surface that is adapted to contact the O-ring 21. A coil spring 28 is interposed between a guide member 29 and a washer 30 to yieldingly urge the diaphragm and in turn the valve 27 against the O-ring. A screw 31 is threaded into a fitting 32 in the housing part 12 and engages the guide member 29 so that the tension of the spring 28 on the diaphragm can be adjusted.

In use, fuel enters through pipe 17 into chamber 15 and if the pressure of the fuel is sufficient, the diaphragm 14 is moved outwardly in turn moving the valve 27 away from the O-ring and permitting the fuel to flow axially outwardly through the opening 19. When the fuel pressure is insufficient, the diaphragm 14 is moved axially bringing the valve 27 into engagement with the O-ring and positively cutting off the fuel without leakage.

Figure 5:
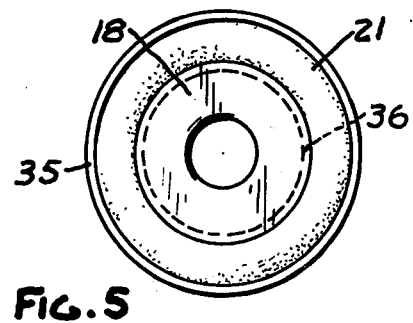
FIG. 5 is an end view of a portion of the assembly shown in FIG. 4.

In the form shown in FIGS. 4 and 5, the retainer 35 is generally cylindrical but does not have an interference fit with the connector 18 but rather, the connector 18 is formed with an annular groove 36 into which a portion 37 of the retainer is deformed. The free end 38 of the retainer in this form is cylindrical. As in the previous form of the invention, when in position, a portion of the O-ring 21 extends axially beyond the end of the connector 18.

Figure 6:
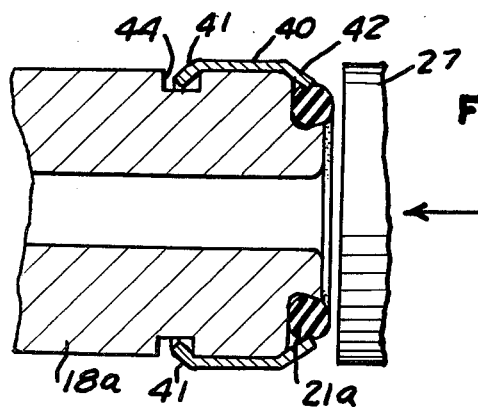
FIG. 6 is a fragmentary sectional view of a portion of a further modified form of fuel regulator assembly.
Figure 7:
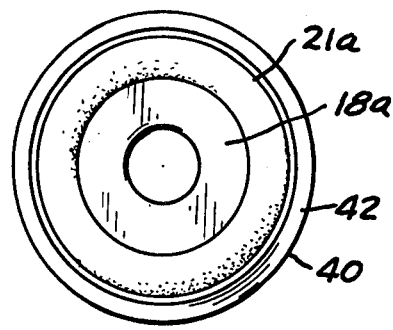
FIG. 7 is an end view of a portion of the assembly shown in FIG. 6.

In the form shown in FIGS. 6 and 7, the left-hand end of retainer 40 is first formed into a cylinder which is slipped over the connector 18 and then a portion thereof is bent radially inwardly, as at 41, into groove 44 to hold the retainer in position. In this form, the free end 42 is formed so that it extends radially inwardly to further hold the O-ring in position. It can be seen that in this form, the connector 18a has a greater diameter than the outer diameter of the O-ring but a portion of O-ring 21a still extends axially beyond connector 18a for sealing purposes.

Figure 8:
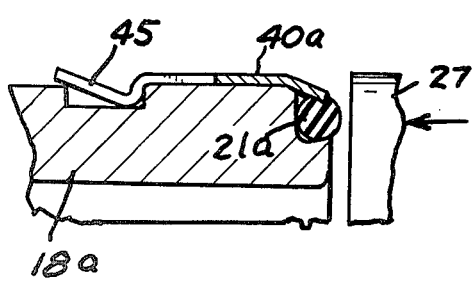
FIG. 8 is a fragmentary sectional view of a portion of another modified form of fuel regulator assembly.

In the form shown in FIG. 8, the retainer 40a is like that shown in FIGS. 6 and 7 and further includes an axially extending and radially outwardly extending portion 45 at its inner end so that it can be more readily applied without crimping.

In each of the forms shown in FIGS. 1-8, the O-ring preferably is mounted in a groove having a configuration as shown and described in connection with FIG. 3.

Figure 9:
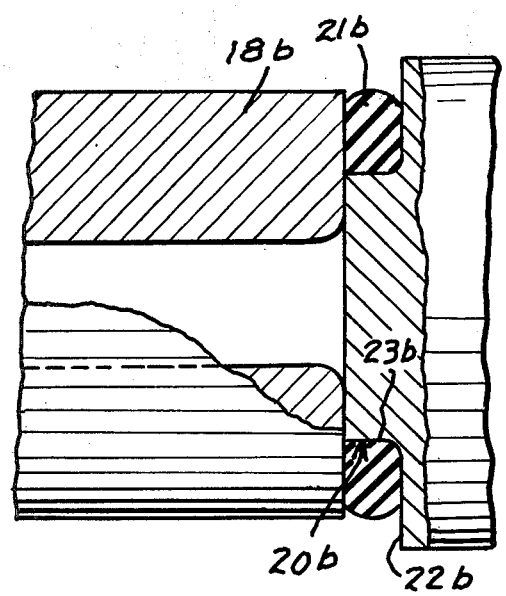
FIG. 9 is a fragmentary longitudinal sectional view of a modified form of the invention.
Figure 10:
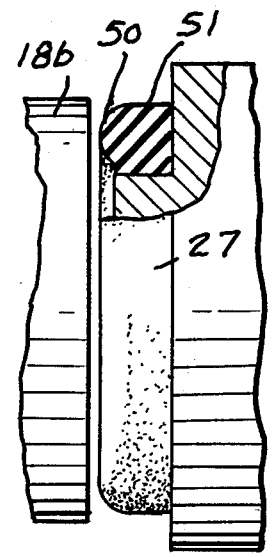
FIG. 10 is a view similar to FIG. 9 showing the parts in relative fuel flow position.

In the form of the invention shown in FIGS. 9 and 10, the sealing ring 21b is molded in place in an annular groove 20b which has a radial surface 22b and an axial surface 23b at a substantially right angle to one another. The sealing ring 21b is made of a resilient material such as rubber molded in the groove such that an arcuate portion 50 extends axially toward the valve member 18b. The sealing ring 21b includes a cylindrical outer surface 51 and is adhered to surfaces 22a,23b. Arcuate portion 50 is tangent to outer surface 51 and has a uniform radius of such magnitude that the arcuate surface is not tangent to the surface 23b.

As shown in FIG. 10, the convex arcuate surface 50 extends axially beyond the end of valve member 27. When the fuel regulator assembly is in fuel cut-off position, sealing ring 21b seals against the end of connector 18b and the valve member 27 engages the end of connector 18b.

Figure 13:
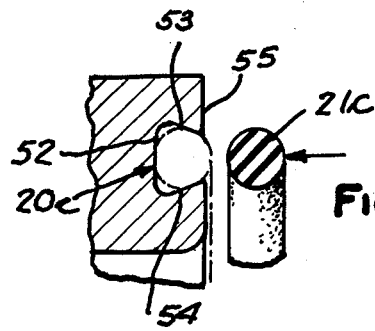
FIG. 13 is a fragmentary sectional view showing the assembly of the O-ring to the parts shown in FIGS. 11 and 12.
Figure 12:
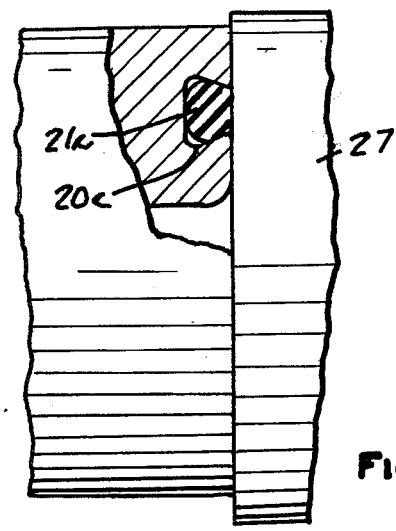
FIG. 12 is an end view of a portion of the assembly shown in FIG. 11.
Figure 11:
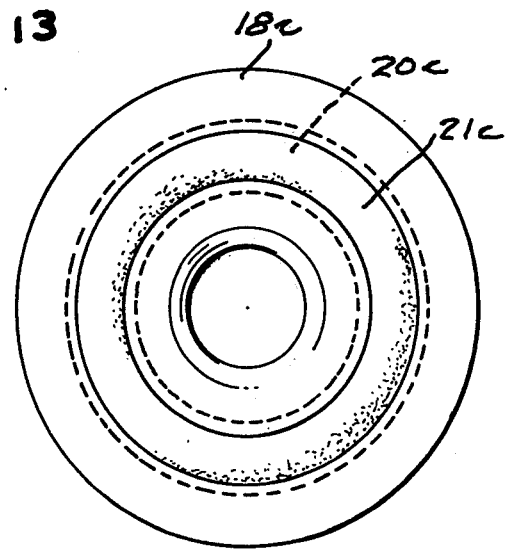
FIG. 11 is a fragmentary longitudinal sectional view showing a further modified form of the invention.

In the form of the invention shown in FIGS. 11-13, the sealing ring 21c comprises an O-ring seated in an annular groove 20c in the end of connector 18c which groove faces axially. The annular groove 20c includes a radial base 52 and inclined side surfaces 53,54 converging axially outwardly. The junctures of the end surface 55 and side surfaces 53,54 are rounded to prevent cutting of the O-ring 21c either during insertion (FIG. 13) or in use. As in the previous forms of the invention, the O-ring 21c extends axially beyond the end of connector 18c.

The forms of the invention shown in FIGS. 9-13 have the advantage of not requiring a separate retainer to maintain the sealing ring in proper position for cutting off the flow of fuel.

Figures 14, 15:
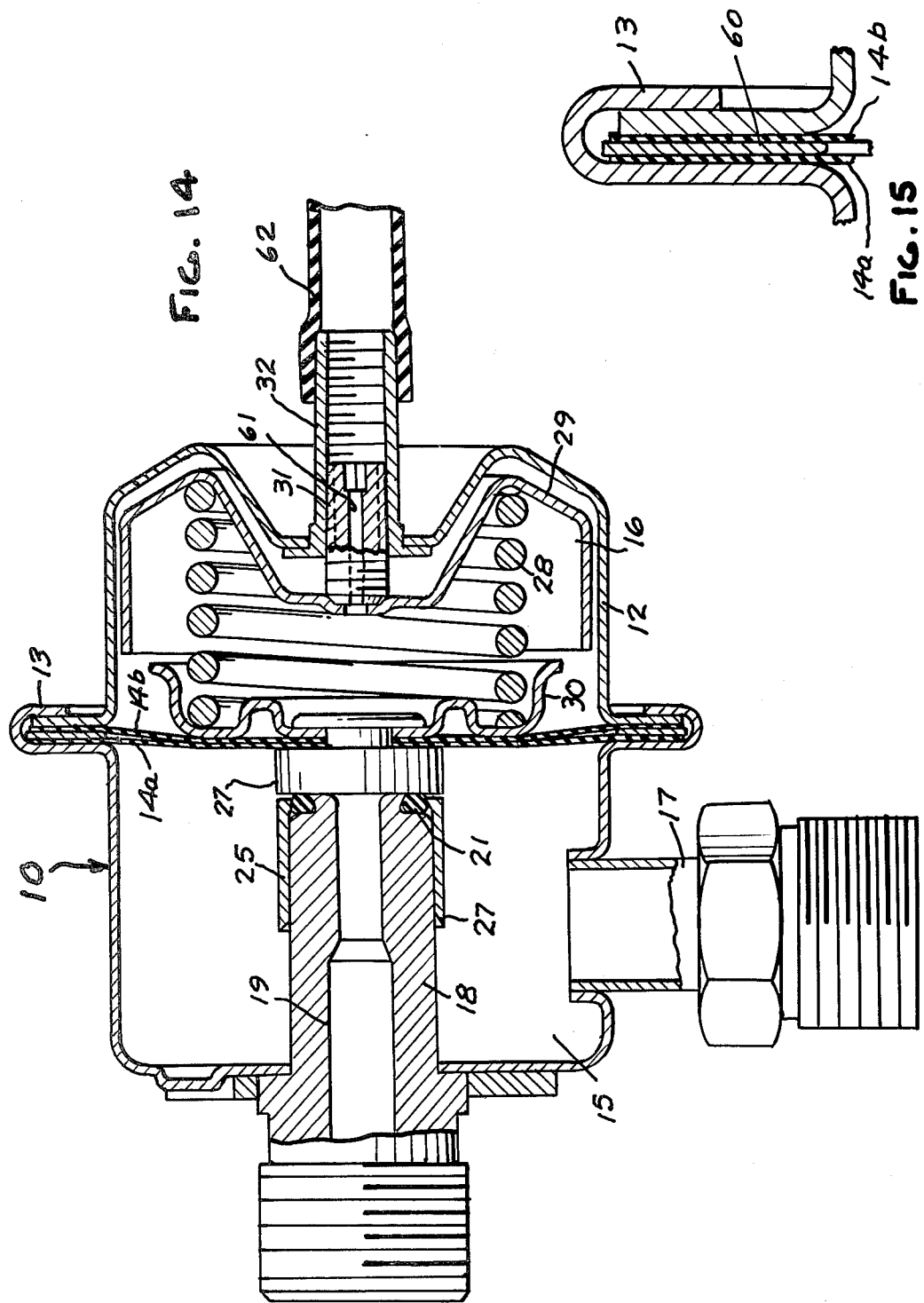
FIG. 14 is a part sectional view of a modified fuel pressure regulator assembly.
FIG. 15 is a fragmentary sectional view on an enlarged scale of a portion of the assembly shown in FIG. 14.

In the form of the invention shown in FIGS. 14 and 15, the assembly is substantially identical to that shown in FIG. 1. However, the assembly differs in the inclusion of a metal ring 60 between the two diaphragms 14a,14b. This improves the pressure applied by crimping and thus facilitates diaphragm retention.

In addition, the form of the invention shown in FIG. 14 includes an axial opening 61 in the screw 31 providing a passageway so that a connection may be made by a tube 62 on fitting 32 to the intake manifold in order that the fuel pressure will be regulated relative to the intake manifold vacuum.

I claim:
1. A fuel pressure regulator assembly comprising,
a housing,
a diaphragm separating said housing into a first and second chamber,
said housing having a radial inlet extending to said first chamber,
a connector mounted in said housing and extending axially into said first chamber,
said connector having an axial outlet,
a sealing ring of resilient material,
interengaging means between said sealing ring and said connector for mounting said sealing ring on said connector such that a portion of said sealing ring projects axially beyond said connector,
said interengaging means comprising an annular groove adjacent the inner end of said connector, said sealing ring comprising a ring in said groove and having an axially extending annular convex arcuate surface,
said groove facing radially outwardly, said sealing ring comprising an O-ring positioned in said groove, and a retainer on said end of said connector restricting the radial outward movement of said O-ring,
said annular groove includes a first surface extending radially, a second surface forming an acute angle with said first surface and extending radially and axially outwardly toward the end of the connector and a curved portion connecting said first and second surfaces of said groove, said curved portion having a lesser radius than the cross sectional diameter of the O-ring,
said retainer frictionally engaging the periphery of said connector,
said diaphragm having a valve member adapted to engage said sealing ring,
and spring means in said second chamber urging said valve member against said sealing ring.
2. The combination set forth in claim 1 wherein said retainer has a tapered surface to facilitate insertion of said retainer on said connector.
3. The combination set forth in claim 1 wherein said retainer includes a radially and axially extending surface in the direction of the end of the connector to restrain the O-ring against axial movement away from the connector.
4. The combination set forth in claim 1 wherein said connector is cylindrical and said retainer is cylindrical.
5. The combination set forth in claim 1 including means interposed between said spring and said housing for varying the force with which said valve member is urged toward said sealing ring.
6. The combination set forth in claim 5 wherein said means comprises a guide member 29 engaging said spring means and an axially extending screw threaded into said housing and extending into contact with said guide member.
7. The combination set forth in claim 6 wherein said screw has an axial passage therethrough.
8. The combination set forth in claim 1 wherein said diaphragm comprises separate diaphragm members and a ring interposed between said diaphragms, said housing clamping said diaphragm members against said ring.
9. A fuel pressure regulator assembly comprising,
a housing,
a diaphragm separating said housing into a first and second chamber,
said housing having a radial inlet extending to said first chamber,
a connector mounted in said housing and extending axially into said first chamber,
said connector having an axial outlet,
a sealing ring of resilient material,
interengaging means between said sealing ring and said connector for mounting said sealing ring on said connector such that a portion of said sealing ring projects axially beyond said connector, said interengaging means comprising an annular groove adjacent the inner end of said connector, said sealing ring comprising a ring in said groove and having an axially extending annular convex arcuate surface, said groove facing radially outwardly, a retainer on said end of said connector restricting the radial outward movement of said ring, said retainer frictionally engaging the periphery of said connector, said diaphragm having a valve member adapted to engage said sealing ring, and spring means in said second chamber urging said valve member against said sealing ring.

10. The combination set forth in claim 9 wherein said retainer has a tapered surface to facilitate insertion of said retainer on said connector.

11. The combination set forth in claim 9 wherein said retainer includes a radially and axially extending surface in the direction of the end of the connector to restrain the sealing ring against axial movement away from the connector.

12. The combination set forth in claim 9 wherein said connector is cylindrical and said retainer is cylindrical.

* * * * *